US007004643B1

(12) United States Patent
Johnson et al.

(10) Patent No.: US 7,004,643 B1
(45) Date of Patent: Feb. 28, 2006

(54) FIBER OPTIC COUPLING DEVICE (75) Inventors: Brian E. Johnson, Farmington, MI (US); Jamie Mleczko, Washington Township, MI (US)

(73) Assignee: Yazaki North America, inc., Canton, MI (US)

( * ) Notice: Subject to any disclaimer, the term of this patent is extended or adjusted under 35 U.S.C. 154(b) by 166 days.

(21) Appl. No.: 10/679,114

(22) Filed: Oct. 3, 2003

(51) Int. Cl.
*G02B 6/36* (2006.01)

(52) U.S. Cl. .............................. 385/88; 385/24; 385/72; 385/75

(58) Field of Classification Search ................... 385/24, 385/72, 75, 82, 88–94
See application file for complete search history.

(56) References Cited

U.S. PATENT DOCUMENTS

| 4,439,006 A | 3/1984 | Stevenson |
| 4,758,719 A | 7/1988 | Sasaki et al. |
| 5,299,958 A | 4/1994 | Ohsumi |
| 5,588,080 A | 12/1996 | Kawamura |
| 5,617,495 A | 4/1997 | Funabashi et al. |
| 5,848,919 A | 12/1998 | Nagano |
| 6,135,644 A | 10/2000 | Hakogi et al. |
| 6,231,392 B1 | 5/2001 | van Woensel |
| 6,390,687 B1 * | 5/2002 | Shirakawa ................... 385/86 |
| 6,454,464 B1 | 9/2002 | Nolan |

* cited by examiner

*Primary Examiner*—Phan T. H. Palmer
(74) *Attorney, Agent, or Firm*—Rader, Fishman & Grauer PLLC (57) ABSTRACT A fiber optic coupling device that securely holds a ferrule of a fiber optic cable in alignment with an optical interface of a fiber optic transceiver (FOT) device. Included is a guide member that has one or more guide channels and which is inserted into a connector body. A ferrule residing in one of the guide channels is prevented from moving forward in the guide channel due to the guide member engaging a shoulder on the ferrule. Similarly, the ferrule is prevented from moving backwards in the guide channel due to the connector body engaging the shoulder of the ferrule.

42 Claims, 5 Drawing Sheets

FIBER OPTIC COUPLING DEVICE

FIELD OF THE INVENTION

The present invention relates to a fiber optic coupling device, and, more specifically, to a device that securely holds a ferrule of a fiber optic cable in alignment with an optical interface of a fiber optic transceiver (FOT) device, thereby allowing the two components to be coupled to one another in an efficient manner.

BACKGROUND OF THE INVENTION

Figure 1:
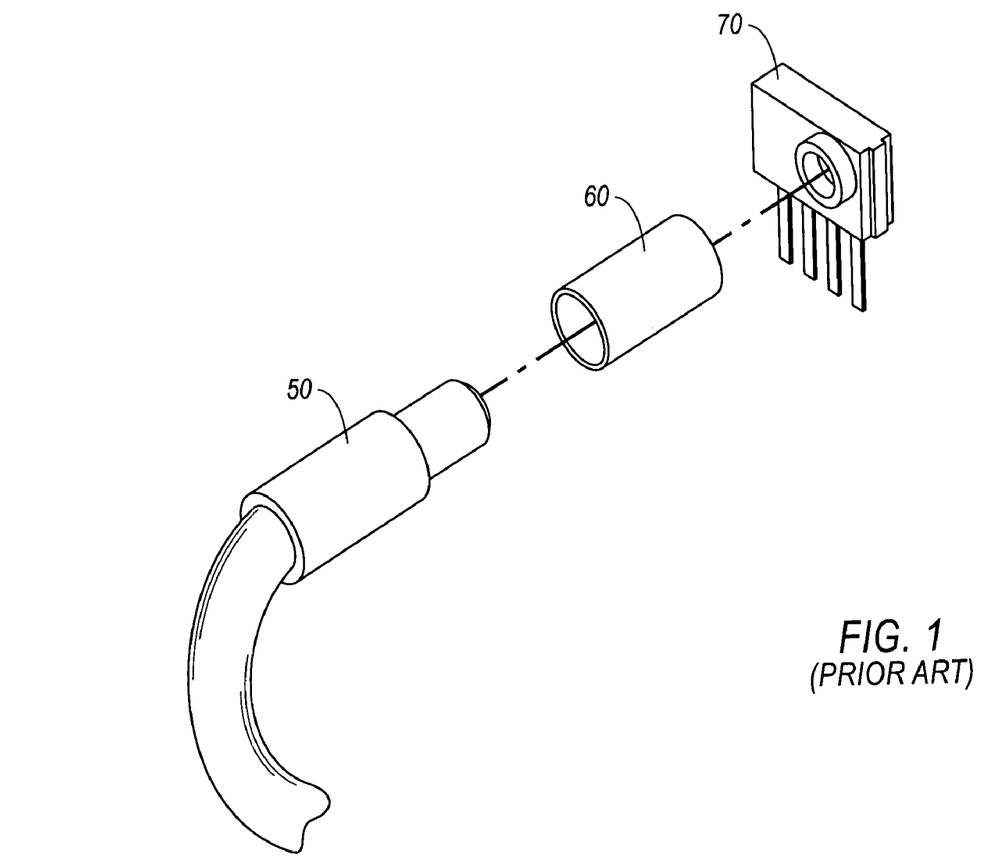
FIG. 1 is a basic illustration of a typical fiber optic coupling system.

Fiber optic transceiver (FOT) devices, also known as optical-electronic devices, optoelectronic devices, optical converters and other names known in the art, are coupled with optical fibers for data and signal transmission by converting optical signals into electric signals and electric signals into optical signals. Various types of connectors are known in the art for coupling an end or head of an optical fiber to a light-receiving and/or light-transmitting interface on the FOT device. According to typical connecting schemes, an example of which is illustrated in FIG. 1, the end of the fiber optic is terminated with a ferrule 50 that aids in alignment and protection of the stripped end of the fiber. The ferrule 50 is then inserted into a lens sleeve 60, which is needed to align and couple the end of the ferrule with the FOT device 70. However, the use of a lens sleeve 60 to couple an optical fiber to a FOT device 70 may result in degradation of the optical signal being conveyed by the optic fiber. This signal degradation is due to two separate issues. First, lens sleeves 60 are often incapable of providing an accurate coupling of the ferrule 50 to the FOT device 70 due to an inability to accurately align the two components within specified tolerance ranges. Second, the use of a lens sleeve 60 introduces an additional optical interface through which the optical signal must pass, resulting in increased attenuation of the signal. Accordingly, the inventors of the present invention have realized the need for a device that accurately aligns and couples the fiber optic and ferrule to a FOT device without introducing any additional optical interfaces.

SUMMARY OF THE INVENTION

The present invention relates to a fiber optic coupling device that securely holds a ferrule of a fiber optic cable in alignment with an optical interface of a fiber optic transceiver (FOT) device. The ferrule is retained in an elongated channel of a guide member, with the guide member inserting into a connector body. The ferrule is prevented from moving forward in the guide channel due to the guide member engaging a shoulder on the ferrule. Similarly, the ferrule is prevented from moving backwards in the guide channel due to the connector body engaging the shoulder on the ferrule.

DETAILED DESCRIPTION

Figure 2:
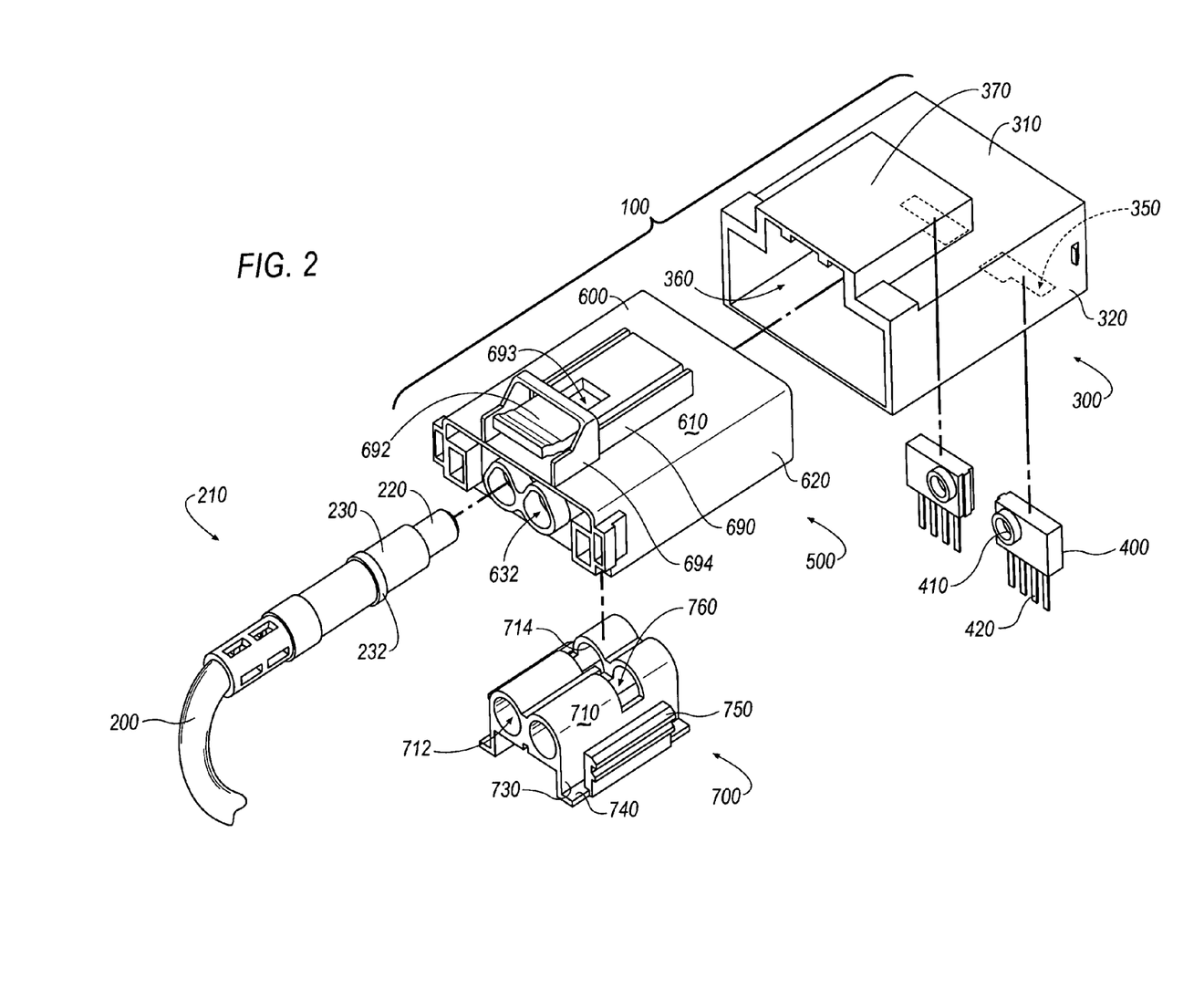
FIG. 2 is an exploded perspective view of the various components that comprise the fiber optic coupling device according to one embodiment of the present invention.

Illustrated in FIG. 2 is an exploded perspective view of the alignment connection device 100, which is comprised of several components, including a housing 300, fiber optic transceiver (FOT) device 400, and a connector 500, which itself is comprised of a body 600 and latching guide 700. When assembled, alignment connection device 100 appropriately aligns and couples ferrule 210, which encases the end of the optical fiber cable 200, with the FOT device 400.

As illustrated in FIG. 2, optical fiber cable 200 terminates within a rigid tube or ferrule 210 used to protect and align the stripped end of the fiber optic cable 200. Ferrule 210 includes a tip portion 220 of a first diameter. Moving inwardly from the tip of the ferrule 210 toward the length of the fiber optic cable 200, tip portion 220 terminates at a collar 230, or second portion of the ferrule 210, having a second diameter greater in size than the first diameter of tip portion 220. Located on the collar 230 is an annular rib or shoulder 232, positioned along the length of the collar 230 so as to align radially with the cut-out or opening 760 of the guide tube 710, as will be discussed later, when the alignment connection device 100 is fully assembled.

Housing 300 is a hollow, box-like structure that is, according to a first embodiment of the present invention, constructed from a monolithic piece of molded plastic. According to alternate embodiments, housing 300 may be constructed out of metal, ceramic or any other material used in the art.

Figure 7:
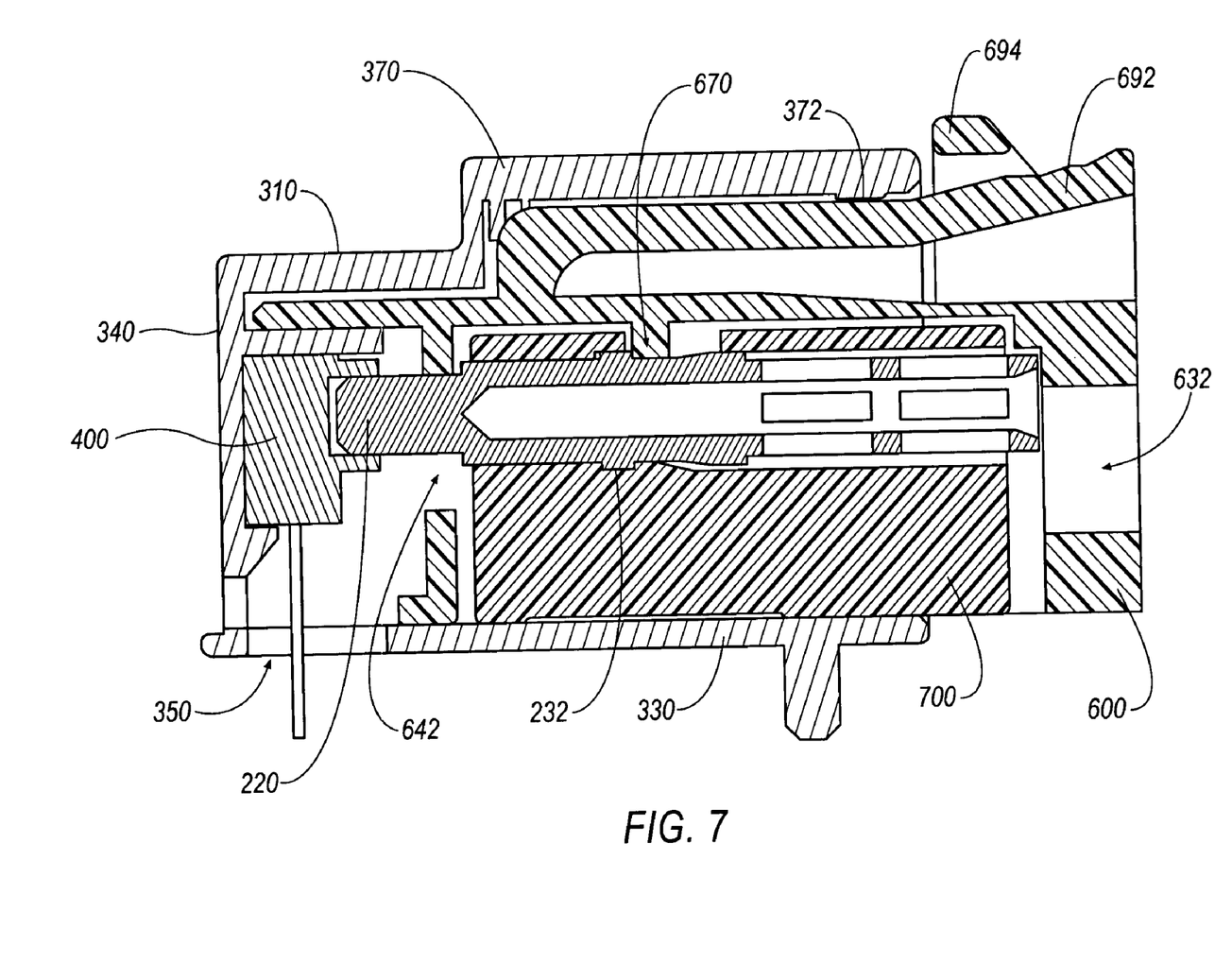
FIG. 7 is a cross-sectional view of the fiber optic coupling device depicted in FIG. 6.

Housing 300 comprises a top wall 310, two opposed side walls 320, a bottom wall 330 (obscured in the view of FIG. 2 but illustrated in FIG. 7) and one rear end wall 340 (illustrated in FIG. 7). The front end of housing 300 is open, revealing a cavity 360 that accommodates connector 500. Within bottom wall 330 are one or more cut-outs or openings 350 that allow for the insertion of one or more FOT devices 400 into one or more cavities (not illustrated) located in the rear of the housing 300 and designed to securely hold the FOT devices 400. In the exemplary embodiment illustrated in FIG. 2, housing 300 has two openings 350 within the rear portion of bottom wall 330, each accepting one FOT device 400. Projecting outward from the top wall 310 of housing 300 is a guide channel 370 that receives one or more guide walls 690 and a latching member 692 of the connector body 600 when the connector 500 is inserted into cavity 360 of housing 300.

The fiber optic transceiver (FOT) device 400 is an optical-electronic device designed to convert electric signals to optical signals that are subsequently transmitted out through the fiber optic cable 200, and/or convert optical signals received from fiber optic cable 200 to electric signals. When the alignment connection device 100 is fully assembled, tip portion 220 of ferrule 210 extends into and resides within the cavity 410 defined by the annular ring projecting out from the main body of the FOT device 400. This cavity 410 represents the actual interface between fiber optic cable 200 and FOT device 400. Extending out and downward from the main body of FOT device 400 is one or more electrical connectors 420 (four such electrical connectors 420 are depicted in the embodiment illustrated in FIG. 2) that allow electrical signals to be exchanged between the FOT device 400 and another component or system designed to generate and/or evaluate the signals delivered through the fiber optic cable 200.

Connector 500 is comprised of a body 600 and a latching guide 700, and is designed to be inserted into cavity 360 and removably secured inside housing 300. When appropriately assembled, connector 500 securely houses the ferrule 210 of fiber optic cable 200. Furthermore, ferrule 210 is secured within connector 500 in such a position that upon insertion of connector 500 into housing 300, the tip 220 of ferrule 210 is aligned with and securely coupled to cavity 410 of the fiber optic transceiver (FOT) device 400.

Figure 3:
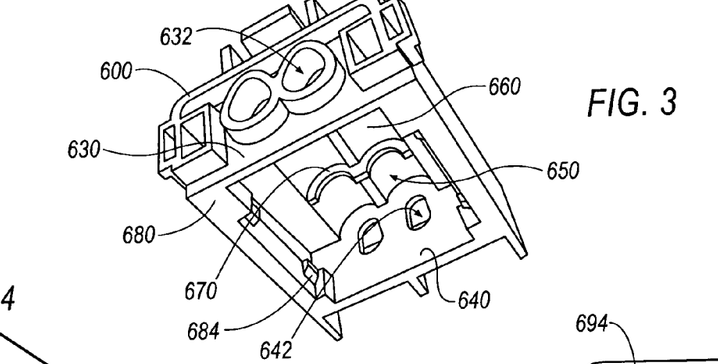
FIG. 3 is a perspective view of the body of the connector of the fiber optic coupling device.
Figure 4:
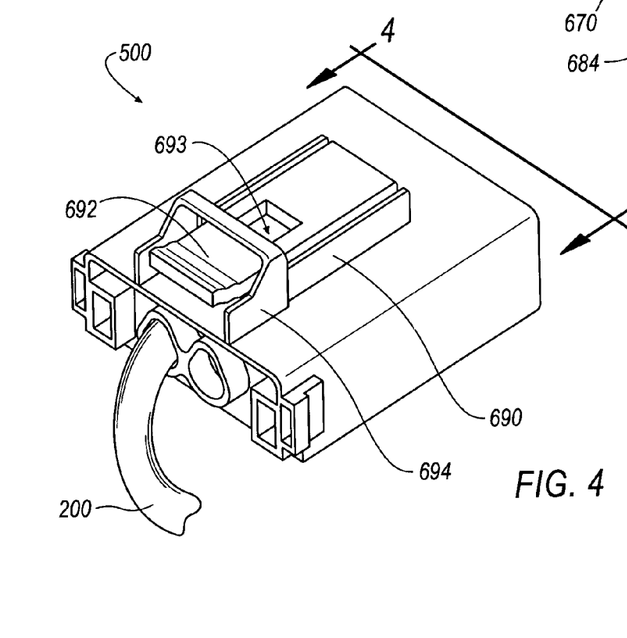
FIG. 4 is a perspective view of an assembled connector of the fiber optic coupling device.

As indicated above, the connector 500 has two main parts: (i) a body 600, and (ii) a latching guide 700. As illustrated in FIGS. 2 and 3, body 600 is a box-like structure having an upper or top wall 610, two opposed side walls 620, a front end wall 630 (labeled in FIG. 3), and a rear end wall 640 (illustrated in FIG. 3) that is inwardly recessed from the edge of body 600. Accessible from the underside of body 600 is a cavity 650 (illustrated in FIG. 3) that is designed to accommodate the latching guide 700. Located within the front end wall 630 are one or more openings 632 that communicate with cavity 650. Similarly, present in the rear end wall 640 are one or more openings 642 that communicate with cavity 650 and which generally align with the front end wall openings 632. In the illustrated embodiment, both the front end wall 630 and rear end wall 640 possess two such openings 632 and 642, respectively.

Looking up from below into cavity 650, as illustrated in FIG. 3, it is observed that the underside of top wall 610 possesses one or more guide grooves 660 that are arcuate in cross section and which generally align between corresponding end openings 632 and 642. In the embodiment illustrated in FIG. 3, connector body 600 is seen to possess two such guide grooves 660 that run parallel to one another. Also located on the underside of the top wall 610 is a transverse rib 670 that protrudes downwardly at a location spaced between the end walls 630 and 640, and which extends perpendicularly across the one or more guide grooves 660 present in the undersurface.

Each side wall 620 of connector body 600 is provided with an inwardly-protruding flange 680 having a recess or cut-out along an inner surface. Adjacent to the opposite ends of each of the cut-outs are fixed locking tabs 684 that work in conjunction with the latching flanges 750 to secure the latching guide 700 into the cavity 650.

Located on the top surface 610 of the connector body 600 is a pair of guide walls 690 that run parallel to one another and which extend along at least a partial length of the top surface 610. Running in-between the guide walls 690 is a resilient, cantilever latching member 692 that extends generally parallel to the top surface 610 and which has an opening 693 located just rearwardly of the stop loop 694 for receiving a latching tab (not depicted) projecting downward from the undersurface of the guide channel 370 of the housing 300. As just mentioned, extending around said cantilever latching member 692 is a stop loop 694 that is affixed to the top surface 610 of said connector body 600, and which functions as a stop upon insertion of the connector 500 (comprising said connector body 600 and latching guide 700) into cavity 360 of housing 300. The stop loop 694 also prevents latching member 692 from being flexed upwardly, which could break the latching member.

The second part of connector 500 is the latching guide 700, comprising one or more elongated guide channels. According to the present embodiment, the elongated guide channels are comprised of hollow cylinders or tubes 710 open at both ends and designed to be securely fastened inside cavity 650 of connector body 600. In the illustrated embodiment, latching guide 700 comprises two hollow tubes 710 that are affixed next to each other so as to be generally parallel. As illustrated in FIG. 2, each tube 710 of latching guide 700 has a substantially planar leg 730 that extends downward, terminating at an outwardly protruding flange 740. The outer edge of the outwardly protruding flange 740 joins to a latching flange 750 which is cantilevered upwardly and generally parallel to the planar side leg 730. The outer surface of latching flange 750 has one or more latching ribs that project outward and extend for the length of the flange 750. When latching guide 700 is inserted into cavity 650, it is the ribs of latching flange 750 that cooperate with the fixed locking tabs 684 on the connector body 600 to in order to secure latching guide 700 inside cavity 650.

One purpose of the alignment connection device 100 is to provide a reliable and easy way to couple a fiber optic cable 200 to a fiber optic transceiver (FOT) device 400 without introducing any additional components that would add another optical interface that could degrade the signal being conveyed through the optical fiber. The alignment connection device 100 accomplishes this purpose through the use of connector body 600 and latching guide 700, which interact with each other in such a manner as to securely hold a ferrule 210. Upon inserting connector 500 into cavity 360 of housing 300, the tip of the ferrule 220 becomes aligned with optical interface 410. Subsequently, the act of securing connector 500 into housing 300 causes the ferrule tip 220 to be brought up against FOT device 400 and become securely coupled to optical interface 410.

The interaction between the various components of the alignment connection device 100 and the ferrule 210 will now be discussed with reference to the particular embodiment illustrated in the Figures. Ferrule 210 is passed through opening 632 of the connector body 600, where it then inserts into and resides within the associated elongated cylinder or tube 710. Tube 710 is effectively divided into two sections by the cut-out or recess 760. The first section 712 is generally of a large enough internal diameter to allow passage of the annular rib or shoulder 232 present on the ferrule 210. The second section 714, disposed after cut-out 760, is of a sufficiently sized internal diameter to securely accommodate the larger section or collar 230 of ferrule 210 while preventing passage of the annular rib or shoulder 232. This positions ferrule 210 inside tube 710 so that at least a portion of the lesser-diameter tip portion 220 of the ferrule 210 extends out the other end of the tube 710. This is best illustrated in FIG. 7, which depicts a cross-sectional view of the fully assembled alignment connection device 100.

During the assembly stage, latching guide 700 is inserted into cavity 650, causing the latching guide 700 to become secured inside the connector body 600 due to the interaction between latching flanges 750 and fixed locking tabs 684. When ferrule 210 is positioned as far forward as it can go inside latching guide 700, ferrule tip portion 220 extends out of tube 710 and through the appropriate opening 642 in the rear end wall 640 of the connector body 600.

Figure 5:
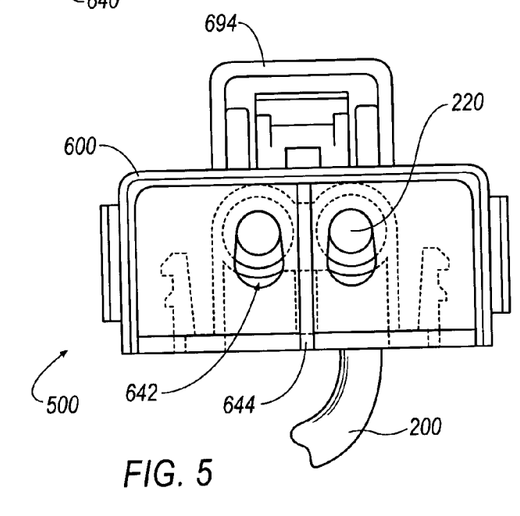
FIG. 5 depicts an alternative view of the assembled connector of FIG. 4.
Figure 6:
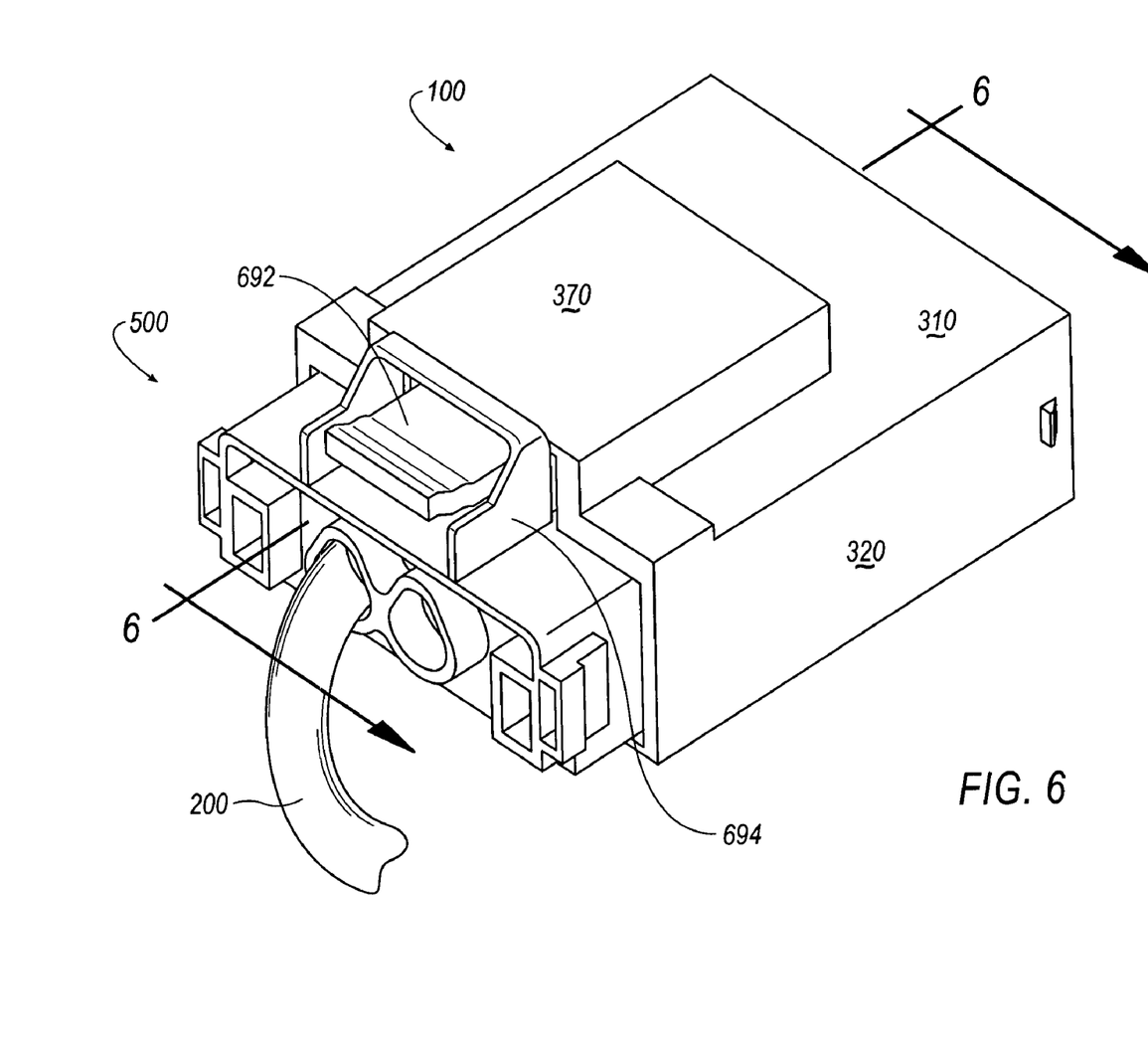
FIG. 6 is a perspective view of the fiber optic coupling device fully assembled.

As illustrated in FIG. 5, the rear end wall openings 642 are generally of an elongated or tear-drop shape, with a lower portion of opening 642 being wider or of a larger diameter than an upper portion of the opening 642. When secured inside connector body 600, the latching guide 700 is held high enough inside the connector body 600 to cause the ferrule tip portions 220 to be displaced upward into the narrower or lesser-diameter portion of opening 642. This effectively results in ferrule tip 220 being confined within the lesser-diameter portion of opening 642, thereby securing ferrule tip 220 from any sideways-directed movement within the opening 642.

Upon inserting latching guide 700 into connector body 600, ferrule 210 becomes effectively secured in such a manner as to prevent the ferrule 210 from moving forward or backward within the tube 710. Specifically, the ferrule 210 is substantially secured so that is cannot move any farther forward within the tube 710 toward the read end wall 640 of the connector body 600, nor can the ferrule 210 undergo any substantial backwards movement toward the front end wall 630 of the connector body 600. This prevention of back-and-forth movement of the ferrule 210 is accomplished by means of the transverse rib 670 that protrudes out from the underside of the connector body 600. Specifically, the action of bringing latching guide 700 up into cavity 650 and securing it inside the connector body 600 results in the placement of rib 670 in such a position that it extends down through the cut-out or opening 760 present within the top of the hollow guide tubes or cylinders 710. This brings transverse rib 670 in at least close proximity to ferrule 210 at a point on the ferrule 210 that lies next to the annular rib or shoulder 232 on the side farthest from the tip 220 of the ferrule 210. Consequently, any significant rearward movement of ferrule 210 is prevented due to the transverse rib 670 abutting up against the annular shoulder 232.

Accordingly, connector 500 securely holds ferrule 210 in one position, allowing one to readily align and couple the ferrule 210 to the FOT device 400. Coupling of ferrule 210 to FOT device 400 is accomplished by simply inserting connector 500, made up of connector body 600 and latching guide 700, into cavity 360 and subsequently securing the connector 500 in housing 300. Connector 500 is secured into housing 300 by simply aligning connector 500 up with the opening 360 and then sliding it into the housing 300. To prevent the connector 500 from being accidentally pulled out of the housing 300, the latching tab (not depicted) extending down from the underside of the housing 300 inserts into the opening 693 present on the cantilever latching member 692. In order to remove the connector 500, one simply applies downward force upon the cantilever latching member 692, pushing it down until opening 693 clears the latching tab.

Accordingly, the connector 500, comprised of a connector body 600 and latching member 700, secures the ferrule 210 of a fiber optic cable 200 in such a position that the tip 220 of the ferrule aligns up with the optical interface 410 of the fiber optic transceiver (FOT) device 400 once the connector 500 is inserted into the housing 300. Pushing the connector 500 farther forward into the housing 300 subsequently results in the coupling of ferrule tip 220 to the FOT device 400 at the optical interface 410.

In the embodiments presented above, it is assumed that the housing 300, connector body 500 and latching guide 700 are monolithic structures formed, for example, through a process such as injection molding. According to an alternative embodiment, any one or more of these structures may be comprised of multiple constituents and/or multiple components integrated together to form a functional structure.

While the invention has been specifically described in connection with certain specific embodiments thereof, it is to be understood that this is by way of illustration and not of limitation, and the scope of the appended claims should be construed as broadly as the prior art will permit.

What is claimed is:

1. A device for coupling a ferrule of a fiber optic cable to a fiber optic transceiver (FOT) device, comprising:
    a connector body having a plurality of sides and two generally opposing ends, said plurality of sides and two ends together generally defining a cavity therebetween, and wherein said two ends both have at least one opening each that are configured to allow a ferrule and/or a fiber optic cable to pass therethrough;
    a guide member having an elongated guide channel, said guide channel being configured to receive at least a portion of the ferrule therethrough;
    wherein one of said plurality of sides of said connector body has an opening that is configured to receive said guide member therethrough into said cavity, and said guide member and said connector body interact with each other and the ferrule in such a manner as to secure the ferrule from substantial movement relative to said connector body.

2. The device according to claim 1, wherein said connector body and said guide member secure the ferrule in such a position that a tip of the ferrule is readily aligned with an optical interface section of the FOT device.

3. The device according to claim 2, wherein at least a portion of said connector body is configured to be inserted into and removably secured inside a housing, said housing having a fiber optic transceiver device.

4. The device according to claim 3, wherein said tip of the ferrule is coupled with said optical interface of said FOT device when said connector body is removably secured inside said housing.

5. The device according to claim 1, wherein at least a portion of the ferrule is housed within said elongated guide channel of said guide member in such a position that a tip of the ferrule extends outward through said second opening of said connector body.

6. The device according to claim 5, wherein said second opening of said connector body is generally elongated in shape, with one end of said elongated second opening being of lesser diameter than an opposite end of said elongated second opening.

7. The device according to claim 6, wherein said guide member secures within said connector body in such a manner as to displace said tip of the ferrule, extending through said second opening, toward said lesser diameter end of said elongated second opening.

8. The device according to claim 1, wherein said guide member substantially secures the ferrule from forward-directed movement within said elongated guide channel, and said connector body substantially secures the ferrule from backwards-directed movement within said elongated channel.

9. The device according to claim 8, further comprising a ridge that extends outwardly from an underside of said connector body at such a position that upon securing said guide member into said connector body, said ridge extends down through an opening in said elongated channel at a position along the ferrule located rearward of a shoulder on the ferrule extending axially outward, wherein interaction between said ridge and said shoulder secures the ferrule from any substantial backwards-directed movement.

10. A method of securely positioning a ferrule of a fiber optic cable in relation to a fiber optic transceiver (FOT) device, comprising the steps of:
    securing at least a portion of the ferrule within an elongated channel of a guide member in such a manner as to substantially prevent forward-directed movement of the ferrule within said guide channel;

inserting said guide member through an opening in a side of a connector body and into an interior cavity of said connector body, said side being substantially parallel to an axis of said elongated channel when said guide member is in said cavity; and securing said guide member in said interior cavity in such a manner as to substantially prevent backwards-directed movement of the ferrule within said guide channel.

11. The method according to claim 10, further comprising the step:

extending a tip of the ferrule through an opening within an end wall of said connector body.

12. The method according to claim 11, further comprising the step of substantially securing said tip of the ferrule from movement within said opening.

13. The method according to claim 12, wherein said step of securing said tip of the ferrule comprises displacing said tip of the ferrule from a first end of said opening to a second end of said opening, said second end being of lesser diameter than said first end.

14. The method according to claim 10, further comprising the step of:

extending a ridge out from a wall of said connector body and through an opening in said elongated channel, said ridge extending out at a location that corresponds to a position on the ferrule lying to one side of a shoulder that extends axially outward from the ferrule, said ridge engaging said shoulder so as to substantially prevent backwards-directed movement of the ferrule within the guide channel.

15. The method according to claim 10, further comprising the steps of:

inserting said connector body into a housing containing said FOT device; and coupling said tip of the ferrule to said FOT device by removably securing said connector body to said housing.

16. A fiber optic connection device capable of securely positioning a ferrule of a fiber optic cable in relation to a fiber optic transceiver (FOT) device, comprising:

a guide member configured to be secured into a cavity of a housing having a fiber optic transceiver (FOT) device, said guide member being configured to permit an end of said ferrule to extend beyond an end of said guide member proximate said fiber optic transceiver (FOT) device;

means for substantially preventing forward-directed movement of the ferrule upon the ferrule being generally secured in said cavity; and means for substantially preventing backwards-directed movement of the ferrule upon the ferrule being generally secured in said cavity.

17. The device according to claim 16, wherein the guide member has an elongated channel into which is inserted at least a portion of the ferrule.

18. The device according to claim 17, wherein said means for preventing backwards-directed movement of the ferrule includes means for securing said guide member within a cavity of a connector body.

19. The device according to claim 18, wherein said means for preventing backwards-directed movement of the ferrule includes means for substantially preventing backwards-directed movement of a shoulder on the ferrule.

20. The device according to claim 19, wherein securing said guide member within a cavity of a connector body results in a ridge extending out from a surface of the connector body at a position along the ferrule located rearwardly of said shoulder, said ridge substantially preventing backwards-directed movement of the ferrule by said ridge engaging said shoulder.

21. The device according to claim 18, further comprising means for coupling said tip of the ferrule to the FOT device.

22. The device according to claim 21, wherein said coupling means comprises means for removably securing said connector body to a housing containing the FOT device.

23. The device according to claim 17, wherein said means for preventing forward-directed movement of the ferrule includes a portion of said elongated channel engaging a shoulder on the ferrule.

24. The device according to claim 16, further comprising means for substantially preventing movement of a tip of the ferrule along a second axis, wherein said second axis lies perpendicular to a first axis associated with backwards and forwards-directed movement of the ferrule.

25. The device according to claim 24, wherein said means for preventing movement of said tip of the ferrule along a second axis includes means for displacing said tip of the ferrule from a first, wide end of an opening to a second, narrow end of said same opening.

26. A fiber optic connection device for connecting a ferrule of a fiber optic to a fiber optic transceiver (FOT) device, comprising:

a hollow connector body having an interior cavity that opens outwardly through one side of said body, along with first and second end walls having generally aligned first and second openings, respectively, that communicate with said cavity; and a guide member having an elongated guide channel configured to receive at least a portion of the ferrule therethrough, said guide member capable of being inserted into said cavity of said connector body and secured therein in such a manner that said guide channel generally aligns with said first and second openings on said connector body; and wherein the ferrule, having a shoulder that extends axially outward, is retained in said elongated guide channel of said guide member in such a position that a tip of the ferrule extends outward through and beyond said second opening of said connector body, the ferrule being substantially secured from forward movement in said guide channel due to said guide member engaging said shoulder on the ferrule, and the ferrule being substantially secured from backwards movement in said guide channel due to said connector body engaging said shoulder of the ferrule.

27. The fiber optic connection device according to claim 26, further comprising a housing containing a fiber optic transceiver (FOT) device.

28. The fiber optic connection device according to claim 27, wherein the fiber optic transceiver (FOT) device includes an optical interface designed to securely couple with said tip of the ferrule.

29. The fiber optic connection device according to claim 28, wherein at least a portion of said connector body can be inserted into and removably secured inside said housing.

30. The fiber optic connection device according to claim 29, wherein insertion of said connector body into said housing brings said tip of the ferrule into alignment with said optical interface of the fiber optic transceiver (FOT) device.

31. The fiber optic connection device according to claim 28, wherein said tip of the ferrule becomes coupled to said optical interface of the fiber optic transceiver (FOT) device upon said connector body being removably secured inside said housing.

32. The fiber optic connection device according to claim 26, wherein said second opening of said connector body is generally elongated in shape along a first axis, with one end of said elongated second opening being of lesser diameter than an opposite end of said elongated second opening.

33. The fiber optic connection device according to claim 32, wherein the insertion and retention of said guide member into said connector body results in said tip of the ferrule, extending outward through said elongated second opening of said connector body, to be displaced toward said lesser diameter end of said elongated second opening.

34. The fiber optic connection device according to claim 33, wherein said lesser diameter end of said elongated second opening is appropriately dimensioned so as to prevent movement of said tip of the ferrule along a second axis perpendicular to said first axis.

35. The fiber optic connection device according to claim 26, wherein said connector body engages said shoulder of the ferrule by means of a ridge that extends outwardly from an underside of said connector body, said ridge extending out at a location that corresponds to a position on the ferrule lying to one side of said shoulder opposite said tip of the ferrule.

36. The fiber optic connection device according to claim 35, wherein said elongated guide channel comprises a hollow tube having an opening within a top surface of said tube through which said ridge of said connector body extends.

37. The fiber optic connection device according to claim 26, wherein said connector body and guide member are both monolithic structures.

38. A device for coupling a ferrule of a fiber optic cable to a fiber optic transceiver (FOT) device, comprising:
   a connector body;
   a guide member having at least one channel configured to receive a fiber optic cable therethrough, said guide member being mounted in said connector body; and
   a fiber optic transceiver mounted in said connector body;
   wherein said guide member is configured to maintain a tip of the ferrule extended beyond an end of said guide member, proximate to said fiber optic transceiver.

39. The device according to claim 38, wherein the at least one channel of said guide member is generally elongated in shape, having a first and second opening, wherein one end of said second opening is of lesser diameter than an opposite end of said second opening.

40. The device according to claim 39, wherein said guide member secures the ferrule within said connector body in such a manner as to displace said tip of the ferrule, extending through said guide member, toward said lesser diameter end of said second opening.

41. The device according to claim 38, wherein the connector body engages a shoulder of the ferrule by means of a ridge that extends outwardly from an underside of said connector body, said ridge extending out at a location that corresponds to a position on the ferrule lying to one side of a shoulder opposite the tip of the ferrule.

42. The device according to claim 38, wherein said guide member is configured to be inserted through an opening in a side of said connector body and secured inside of a cavity in said connector body, wherein a longitudinal axis of said guide member channel is substantially parallel to said opening when said guide member is secured in said cavity.

\* \* \* \* \*